United States Patent
Wang

(10) Patent No.: US 9,582,390 B2
(45) Date of Patent: Feb. 28, 2017

(54) SYSTEM AND METHOD FOR TESTING COMPUTING HARDWARE IN COMPUTER RACK

(71) Applicant: HON HAI PRECISION INDUSTRY CO., LTD., New Taipei (TW)

(72) Inventor: Cho-Hao Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 123 days.

(21) Appl. No.: 14/694,103

(22) Filed: Apr. 23, 2015

(65) Prior Publication Data

US 2015/0309907 A1 Oct. 29, 2015

(30) Foreign Application Priority Data

Apr. 29, 2014 (TW) .............................. 103115321 A

(51) Int. Cl.
| | |
|---|---|
| *G06F 11/00* | (2006.01) |
| *G06F 11/267* | (2006.01) |
| *G06F 9/48* | (2006.01) |
| *G06F 9/50* | (2006.01) |
| *H04L 29/08* | (2006.01) |
| *G06F 11/22* | (2006.01) |
| *G06F 11/07* | (2006.01) |
| *G06F 11/26* | (2006.01) |

(52) U.S. Cl.
CPC .......... *G06F 11/267* (2013.01); *G06F 9/4856* (2013.01); *G06F 9/5088* (2013.01); *H04L 67/1008* (2013.01); *G06F 11/0709* (2013.01); *G06F 11/22* (2013.01); *G06F 11/26* (2013.01)

(58) Field of Classification Search
CPC ....... G06F 11/0709; G06F 11/26; G06F 11/22
See application file for complete search history.

(56) References Cited

U.S. PATENT DOCUMENTS

| | | | |
|---|---|---|---|
| 7,945,416 B2 * | 5/2011 | Haemel ............... | G06F 11/3688 702/117 |
| 8,856,748 B1 * | 10/2014 | Larsen ................ | G06F 11/3668 717/125 |
| 9,311,202 B2 * | 4/2016 | Wang .................... | G06F 11/263 |
| 2015/0081598 A1 * | 3/2015 | Depizzol .............. | G06N 99/005 706/12 |

* cited by examiner

*Primary Examiner* — Charles Ehne

(74) *Attorney, Agent, or Firm* — Zhigang Ma

(57) ABSTRACT

A method for testing computing hardware detects the current time as being within a predetermined time period and transfers virtual machines (VMs) from a plurality of physical machines to other physical machines as targets according to a load balancing strategy. The load balancing strategy sums of a load ratio of one physical machine including the VM and a load ratio of one physical machine as a target for the transfer; if the sum of the two ratios is less than a preset load ratio, the VM-transferring physical machine is put into a standby state when the transfer takes place as long as the current time is still inside the predetermined time period. Physical machines which are in the standby state and have not been tested are awoken, and the awoken physical machines are connected to the server for testing.

15 Claims, 2 Drawing Sheets

SYSTEM AND METHOD FOR TESTING COMPUTING HARDWARE IN COMPUTER RACK

CROSS-REFERENCE TO RELATED APPLICATION

This application claims priority to Taiwanese Patent Application No. 103115321 filed on Apr. 29, 2014, the contents of which are incorporated by reference herein.

FIELD

The subject matter herein generally relates to testing systems, and particularly to system for testing physical machines and a method thereof, and a computer rack for installing the physical machines.

BACKGROUND

Nowadays, an amount of computing hardware in an internet data center (IDC) is huge. It is difficult to maintain so many items of computing hardware.

BRIEF DESCRIPTION OF THE DRAWINGS

Implementations of the present technology will now be described, by way of example only, with reference to the attached figures.

DETAILED DESCRIPTION

Figure 1:
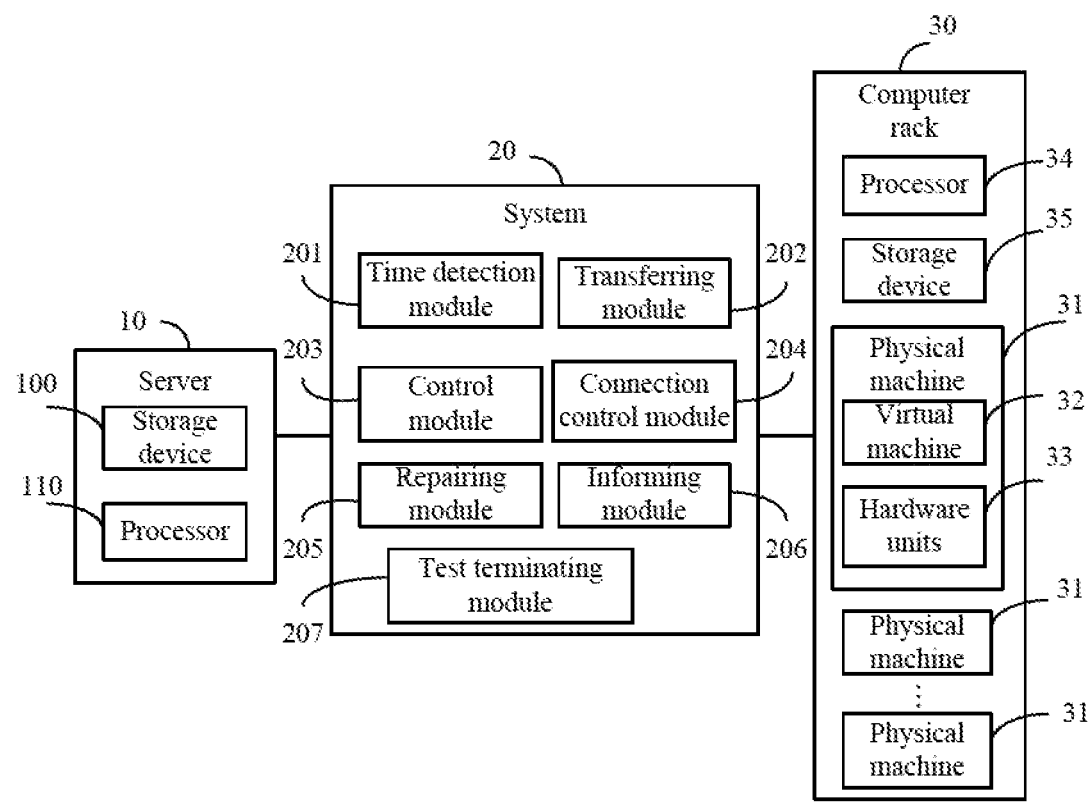
FIG. 1 is a block diagram of a system for testing computing hardware and a running environment for the system, including a computer rack and a server.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by the of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like. The connection can be such that the objects are permanently connected or releasably connected.

FIG. 1 illustrates a system 20 for testing computing hardware ("physical machines") run by a server 10 and at least one computer rack 30. A number of physical machines 31 are installed in each computer rack 30, and each physical machine 31 includes at least one virtual machine (VM) 32 and a number of hardware units 33, such as, a central processing unit, a memory, and a display. In the embodiment, the computer rack 30 is an intelligent computer rack and includes a processor 34 and a storage device 35. The server 10 includes a storage device 100 and a processor 110. The storage device 100 stores a test script which includes a number of test programs to test the status of the hardware units 33 of at least one physical machine 31 when the at least one physical machine 31 is connected to the server 10. In the embodiment, the server 10 can be a preboot execute environment (PXE) server. The computer rack 30 is connected to the server 10 and the physical machines 31. The physical machines 31 are computers, such as desktop computers, servers, and the like.

The system 20 includes a time detection module 201, a transferring module 202, a control module 203, a connection control module 204, a repairing module 205, an informing module 206, and a test terminating module 207. The time detection module 201, the transferring module 202, the control module 203, and the connection control module 204 can be a collection of software instructions stored in the storage device 35 and executed by the processor 34 of each physical machine 31, or can include functionality such as the ability to represent for all purposes items of hardware or physical integrated circuits, or can function as software and hardware combinations, such as a special-purpose processor or a general-purpose processor with special-purpose firmware of the processor 34. The repairing module 205, the informing module 206, and the test terminating module 207 can be a collection of software instructions stored in the storage device 100 and executed by the processor 110 of the server 10, or can include functionality such as the ability to represent for all purposes items of hardware or integrated circuits, or can function as software and hardware combinations, such as a special-purpose processor or a general-purpose processor with special-purpose firmware of the processor 110.

In at least one embodiment, each of the processors 34, 110 can be a central processing unit, a digital signal processor, or a single chip, for example. In at least one embodiment, each of the storage devices 35, 100 can be an internal storage system, such as a flash memory, a random access memory (RAM) for temporary storage of information, and/or a read-only memory (ROM) for permanent storage of information. Each of the storage devices 35, 100 can also be a storage system, such as a hard disk, a storage card, or a data storage medium. Each of the storage devices 35, 100 can include volatile and/or non-volatile storage devices. In at least one embodiment, each of the storage devices 35, 100 can include two or more storage devices such that one storage device is a memory and the other storage device is a hard drive. Additionally, one or more of the storage devices 35 or the storage devices 100 can be located either entirely or partially external relative to the computer rack 30 or the server 10.

The time detection module 201 is used to detect whether current time is within a predetermined time period. In the embodiment, the predetermined time period is a low peak period when the physical machines 31 are running the VMs 32. During the predetermined time period, there are only a few VMs 32 being run by the physical machines 31. The predetermined time period can be 00:00-06:00.

The transferring module 202 is used to transfer the VMs 32 from the physical machines 31 to different physical machines 31, according to a load balancing strategy, when the current time is within a predetermined time period. In the embodiment, the load balancing strategy takes account of a load ratio of one physical machine 31 including the VM 32 to be transferred and a load ratio of one physical machine 31 as a target physical machine to receive the VM 32. The load balancing strategy to be followed is the sum of the above two load ratios, the sum to be less than a preset load ratio, such as 95%. For example, if the load ratio of one physical machine 31 is less than 30%, the VM 32 of that physical machine 31 can be transferred to one target physical machine 31 which has a load ratio of less than 65%. If the load ratio of one physical machine 31 is less than 65%, the VM 32 of the physical machine 31 which has a load ratio of less than 65% also can be transferred to a physical machine 31 (the target physical machine) which has a load ratio of less than 30%.

Therefore, according to the load balancing strategy, as long as the sum of the load ratio of one physical machine 31 including the VM 32 to be transferred and the load ratio of one physical machine 31 as a target to receive the VM 32 is less than the preset load ratio, the VM 32 of the physical machine 31 with a relatively higher load ratio can be transferred to a physical machine 31 with a sufficiently low load ratio, and the VM 32 of the physical machine 31 with a relatively low load ratio can be transferred to a physical machine 31 with a relatively higher load ratio.

The control module 203 is used to control each physical machine 31 of which the VM has been transferred to enter a standby state as long as the current time is within the predetermined time period, as detected by the time detection module 201.

When the time detection module 201 detects that the current time is within the predetermined time period, the connection control module 204 wakes up the physical machines 31 which are in the standby state and have not been tested, and connects the untested awakened physical machines 31 to the server 10, thereby enabling the server 10 to test the awakened physical machines 31 by executing the test script. In one embodiment, the connection control module 204 can wake up the physical machines 31 which are in the standby state and have not been tested via a baseboard management controller (not shown) of the server 10, and then connect the awakened physical machines 31 to the server 10.

The repairing module 205 is used to solve any problems of the physical machines 31 tested by the server 10.

The informing module 206 is used to send information to at least one recipient according to contact information when the repairing module 205 fails to solve at least one problem of at least one physical machine 31. In the embodiment, the informing module 206 can send the information to the at least one recipient via email, short message, or other suitable ways. The recipient can be an administrator of the computer rack 30.

In the embodiment, the control module 203 further controls the physical machines 31 which have been tested by the server 10 to enter the standby state, and the transferring module 202 further transfers the VMs 32 from the physical machines 31 which have not been tested to the physical machines 31 which have already been tested, according to the load balancing strategy, when the current time is still within the predetermined time period.

The test terminating module 207 terminates the test when the current time is not in the predetermined time period, thus causing all of the physical machines to work normally.

Figure 2:
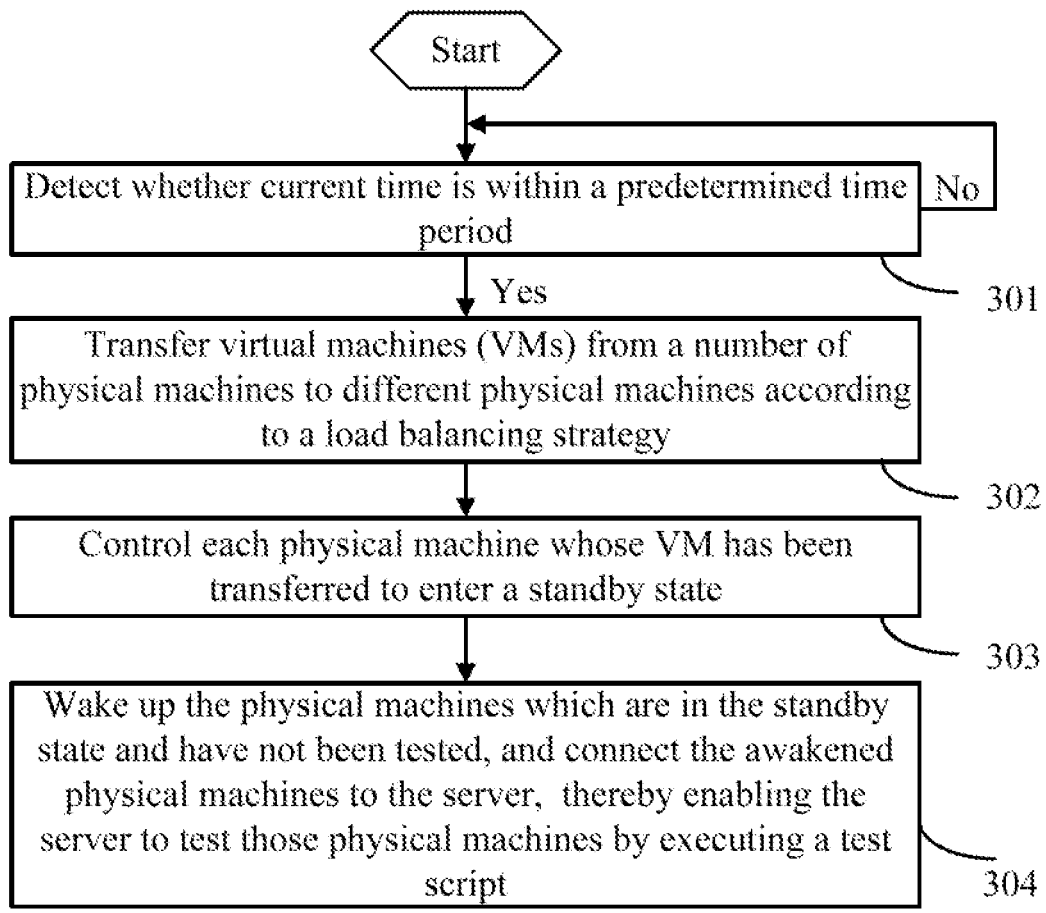
FIG. 2 is a flowchart illustrating a method for testing computing hardware.

FIG. 2 illustrates a flowchart of a method for testing computing hardware. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represent one or more processes, methods, or subroutines carried out in the example method. Additionally, the illustrated order of blocks is by example only and the order of the blocks can be changed. The example method can begin at block 301.

At block 301, a time detection module detects whether current time is inside a predetermined time period. In the embodiment, during the predetermined time period, only a few of VMs 32 are run by physical machines 31. If the current time is within the predetermined time period, the process jumps to block 302, else returns to block 301.

At block 302, a transferring module transfers a number of VMs from physical machines to different target physical machines, according to a load balancing strategy. In the embodiment, the load balancing strategy takes account of a load ratio of one physical machine including the VM and a load ratio of one target physical machine to receive the transferred VM. The load balancing strategy is that the sum of the two load ratios should be less than a preset load ratio, such as 95%.

At block 303, a control module controls each physical machine from which a VM has been transferred to enter a standby state, when the current time is within the predetermined time period.

At block 304, when the time detection module detects that the current time is still within the predetermined time period, a connection control module wakes up the physical machines which are in the standby state and have not been tested, and connects the physical machines woken by it to a server, thereby enabling the server to test the physical machines by executing a test script. In one embodiment, the connection control module wakes up the physical machines via a baseboard management controller of the server, and then connects the awakened physical machines to the server.

In one embodiment, the method further includes steps of a repairing module solving any problems of the physical machines tested by the server 10.

In one embodiment, the method further includes steps of an informing module sending an information to at least one recipient, according to contact information, when the repairing module fails to solve at least one problem of at least one physical machine.

In one embodiment, the method further includes steps of the control module further controlling the physical machines which have been tested by the server to enter the standby state, and the transferring module further transfers the VMs from the untested physical machines to the physical machines which have already been tested, according to the load balancing strategy, when the current time is still within the predetermined time period.

In one embodiment, the method further includes steps of a test terminating module terminating the test when the current time is outside of the predetermined time period, thus allowing all of the physical machines to work normally.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A system for testing computing hardware, the system comprising:
    at least one processor; and
    a plurality of modules which are collections of instructions executable by the at least one processor, the modules comprising:
    a time detection module configured to, upon execution by the at least one processor, cause the at least one processor to detect whether a current time is within a predetermined time period;
    a transferring module configured to, upon execution by the at least one processor, cause the at least one processor to transfer virtual machines (VMs) from a plurality of physical machines respectively to different physical machines according to a load balancing strategy, when the current time is within a predetermined time period, wherein, the load balancing strategy is that a sum of a load ratio of one physical machine comprising the VM to be transferred, and a load ratio of one physical machines as a target machine to receive the VM to be transferred, is less than a preset load ratio;
    a control module configured to, upon execution by the at least one processor, cause the at least one processor to control each physical machine whose VM has been transferred to enter a standby state when the time detection module detects the current time is within the predetermined time period; and
    a connection control module configured to, upon execution by the at least one processor, cause the at least one processor to wake up the physical machines which are in the standby state and have not been tested, and connect the awakened physical machines to a server, thereby enabling the server to test the awakened physical machines by executing a test script.

2. The system according to claim 1, further comprising a repairing module configured to, upon execution of the at least one processor, cause the at least one processor to solve problems of the physical machines tested by the server.

3. The system according to claim 2, further comprising an informing module configured to, upon execution of the at least one processor, cause the at least one processor to send an information to at least one recipient according to contact information when the repairing module fails to solve at least one problem of at least one physical machine.

4. The system according to claim 3, wherein the informing module sends the information to the at least one recipient via email or short message.

5. The system according to claim 1, wherein the control module further controls the awakened physical machines have been tested by the server to enter the standby state, and the transferring module further transfers the VMs from the physical machines which have not been tested to the physical machines which have already been tested according to the load balancing strategy, when the current time is still within the predetermined time period.

6. The system according to claim 1, further comprising a test terminating module configured to, upon execution of the at least one processor, cause the at least one processor to terminate the test when the current time is outside of the predetermined time period.

7. The system according to claim 1, wherein the connection control module wakes up the physical machines which are in the standby state and have not been tested via a baseboard management controller of the server, and then connects the awakened physical machines to the server.

8. A computer rack, comprising:
    a plurality of physical machines, wherein, each physical machine comprises at least one virtual machine (VM);
    a storage device storing a plurality of modules; and
    at least one processor configured to execute the plurality of modules, the plurality of modules comprising:
    a time detection module configured to, upon execution by the at least one processor, cause the at least one processor to detect whether a current time is within a predetermined time period;
    a transferring module configured to, upon execution by the at least one processor, cause the at least one processor to transfer virtual machines (VMs) from a plurality of physical machines respectively to different physical machines according to a load balancing strategy, when the current time is within a predetermined time period, wherein, the load balancing strategy is that a sum of a load ratio of one physical machine comprising the VM to be transferred, and a load ratio of one physical machines as a target machine to receive the VM to be transferred, is less than a preset load ratio;
    a control module configured to, upon execution by the at least one processor, cause the at least one processor to control each physical machine whose VM has been transferred to enter a standby state when the time detection module detects the current time is within the predetermined time period; and
    a connection control module configured to, upon execution by the at least one processor, cause the at least one processor to wake up the physical machines which are in the standby state and have not been tested, and connect the awakened physical machines to a server, thereby enabling the server to test the awakened physical machines by executing a test script.

9. The computer rack according to claim 8, wherein the connection control module wakes up the physical machines via a baseboard management controller of the server, and then connects the awakened physical machines to the server.

10. The computer rack according to claim 8, wherein the control module further controls the physical machines which have been tested by the server to enter the standby state, and the transferring module further transfers the VMs from the physical machines which have not been tested to the physical machines which have already been tested according to the load balancing strategy, when the current time is still within the predetermined time period.

11. A method for testing computing hardware, the physical machine being installed in a computer rack connected to a server, the method comprising:
    detecting whether a current time is within a predetermined time period;
    transferring virtual machines (VMs) from a plurality of physical machines to different physical machines according to a load balancing strategy, when the current time is within a predetermined time period, wherein, the load balancing strategy is that a sum of a load ratio of one physical machine comprising the VM to be transferred, and a load ratio of one physical machines as a target machine to receive the VM to be transferred, is less than a preset load ratio;

controlling each physical machine whose VM has been transferred to enter a standby state when the current time is within the predetermined time period; and waking up the physical machines which are in the standby state and have not been tested, and connecting the awakened physical machines to the server, thereby enabling the server to test the physical machines by executing a test script.

12. The method according to claim 11, further comprising:
resolving problems of the physical machines tested by the server.

13. The method according to claim 12, further comprising:
sending information to at least one recipient according to contact information when failing to resolve at least one problem of at least one physical machine.

14. The method according to claim 11, further comprising:
controlling the physical machines which have been tested by the server to enter the standby state; and
transferring the VMs from the physical machines which have not been tested to the physical machines which have already been tested according to the load balancing strategy when the current time is still within the predetermined time period.

15. The method according to claim 11, further comprising:
terminating the test when the current time is outside of the predetermined time period.

* * * * *